United States Patent
Lin

(10) Patent No.: US 11,713,273 B2
(45) Date of Patent: Aug. 1, 2023

(54) GLASS MATERIAL WITH LOW DIELECTRIC CONSTANT AND LOW FIBERIZING TEMPERATURE

(71) Applicant: TAIWAN GLASS INDUSTRY CORP., Taipei (TW)

(72) Inventor: Chia-Yu Lin, Taipei (TW)

(73) Assignee: TAIWAN GLASS INDUSTRY CORP., Taipei (TW)

(*) Notice: Subject to any disclaimer, the term of this patent is extended or adjusted under 35 U.S.C. 154(b) by 132 days.

(21) Appl. No.: 17/224,296

(22) Filed: Apr. 7, 2021

(65) Prior Publication Data

US 2022/0153628 A1  May 19, 2022

(30) Foreign Application Priority Data

Nov. 16, 2020 (TW) ................ 109139978

(51) Int. Cl.
*C03C 3/112* (2006.01)
*C03C 3/087* (2006.01)

(52) U.S. Cl.
CPC .......... *C03C 3/087* (2013.01); *C03C 3/112* (2013.01)

(58) Field of Classification Search
CPC ......... C03C 3/112; C03C 3/087; C03C 13/00; C03C 13/001; C03C 13/06; C03C 3/093
See application file for complete search history.

(56) References Cited

U.S. PATENT DOCUMENTS

2019/0144329 A1* 5/2019 Inaka .................. C03C 3/093
                                                                          428/220

FOREIGN PATENT DOCUMENTS

| CN | 1092614 C | 10/2002 |
| JP | S62-100454 A | 5/1987 |
| JP | S62-226839 A | 10/1987 |
| JP | 30-2018518440 A | 7/2018 |
| WO | 2017187471 A1 | 11/2017 |

OTHER PUBLICATIONS

Marinopoulos, A. G., et al. "Impurity Segregation at the Si/SiO 2 Interface." APS March Meeting Abstracts. 2007. (Year: 2007).*

* cited by examiner

*Primary Examiner* — Karl E Group
*Assistant Examiner* — Cameron K Miller
(74) *Attorney, Agent, or Firm* — CIPO IP Group

(57) ABSTRACT

A glass material with a low dielectric constant and a low fiberizing temperature includes silicon dioxide, boron trioxide, aluminum oxide, calcium oxide, phosphorus pentoxide and zinc oxide. The silicon dioxide makes up 45%-52% by weight of the glass material. The boron trioxide makes up 25%-30% by weight of the glass material. The aluminum oxide makes up 10%-14% by weight of the glass material. The calcium oxide makes up 1%-4% by weight of the glass material. The phosphorus pentoxide makes up 0-3% by weight of the glass material. The zinc oxide makes up 1%-5% by weight of the glass material. The reduced silicon dioxide content and calcium oxide content and addition of phosphorus pentoxide and zinc oxide in the glass material lower the dielectric constant and fiberizing temperature of the glass material.

38 Claims, 1 Drawing Sheet

| | Embodiments | | | Comparative examples | | | | | | | |
|---|---|---|---|---|---|---|---|---|---|---|---|
| Ingredient(%) | A1 | A2 | A3 | A4 | A5 | A6 | A7 | A8 | A9 | A10 | A11 |
| SiO$_2$ | 49.9 | 50.1 | 49.4 | 48 | 46.2 | 48.1 | 47.3 | 52.9 | 53.9 | 52 | 53.5 |
| Al$_2$O$_3$ | 13 | 13.1 | 12.9 | 12.6 | 12.2 | 12.3 | 12.5 | 12.3 | 11.8 | 12.4 | 13.3 |
| B$_2$O$_3$ | 26.85 | 26.79 | 28.72 | 29.91 | 29.62 | 28.69 | 28.34 | 23.09 | 23.99 | 27.56 | 25.24 |
| CaO | 3.58 | 3.6 | 1.33 | 6.27 | 5.37 | 5.49 | 9.49 | 8.15 | 4.38 | 5.7 | 5.92 |
| MgO | 0.131 | 0.138 | – | 0.044 | 0.145 | 0.119 | 0.22 | 0.472 | 0.188 | – | – |
| ZnO | 3.43 | 3.32 | 4.84 | – | 2.72 | 2.95 | – | – | – | – | – |
| TiO$_2$ | 0.298 | 0.487 | 0.286 | 1.60 | 1.43 | 0.47 | 0.504 | 0.480 | 0.482 | 0.501 | 0.518 |
| P$_2$O$_5$ | 1.32 | 1.14 | – | 0.05 | – | – | – | 3.40 | – | – | – |
| K$_2$O | 0.08 | 0.087 | 0.244 | 0.269 | 0.248 | 0.133 | 0.057 | 0.107 | 0.286 | 0.165 | 0.207 |
| Na$_2$O | 0.487 | 0.313 | 0.524 | – | 0.317 | 0.253 | 0.234 | 0.662 | 0.557 | 0.387 | 0.407 |
| Fiberizing temperature (T3) (°C) | 1307 | 1303 | 1303 | 1269 | 1240 | 1256 | 1233 | 1287 | 1318 | 1337 | 1327 |
| Dk (1GHz) | 4.5 | 4.5 | 4.3 | 4.9 | 4.6 | 4.7 | 4.9 | 4.7 | 4.7 | 4.6 | 4.4 |
| Df (1GHz) | 0.001 | 0.001 | 0.001 | 0.001 | 0.001 | <0.001 | 0.001 | 0.003 | 0.001 | 0.001 | 0.001 |

|  | Embodiments | | | Comparative examples | | | | | | | |
|---|---|---|---|---|---|---|---|---|---|---|---|
| Ingredient(%) | A1 | A2 | A3 | A4 | A5 | A6 | A7 | A8 | A9 | A10 | A11 |
| $SiO_2$ | 49.9 | 50.1 | 49.4 | 48 | 46.2 | 48.1 | 47.3 | 52.9 | 53.9 | 52 | 53.5 |
| $Al_2O_3$ | 13 | 13.1 | 12.9 | 12.6 | 12.2 | 12.3 | 12.5 | 12.3 | 11.8 | 12.4 | 13.3 |
| $B_2O_3$ | 26.85 | 26.79 | 28.72 | 29.91 | 29.62 | 28.69 | 28.34 | 23.09 | 23.99 | 27.56 | 25.24 |
| CaO | 3.58 | 3.6 | 1.33 | 6.27 | 5.37 | 5.49 | 9.49 | 8.15 | 4.38 | 5.7 | 5.92 |
| MgO | 0.131 | 0.138 | -- | 0.044 | 0.145 | 0.119 | 0.22 | 0.472 | 0.188 | -- | -- |
| ZnO | 3.43 | 3.32 | 4.84 | -- | 2.72 | 2.95 | -- | -- | -- | -- | -- |
| $TiO_2$ | 0.298 | 0.487 | 0.286 | 1.60 | 1.43 | 0.47 | 0.504 | 0.480 | 0.482 | 0.501 | 0.518 |
| $P_2O_5$ | 1.32 | 1.14 | -- | 0.05 | -- | -- | -- | -- | 3.40 | -- | -- |
| $K_2O$ | 0.08 | 0.087 | 0.244 | 0.269 | 0.248 | 0.133 | 0.057 | 0.107 | 0.286 | 0.165 | 0.207 |
| $Na_2O$ | 0.487 | 0.313 | 0.524 | -- | 0.317 | 0.253 | 0.234 | 0.662 | 0.557 | 0.387 | 0.407 |
| Fiberizing temperature (T3) (°C) | 1307 | 1303 | 1303 | 1269 | 1240 | 1256 | 1233 | 1287 | 1318 | 1337 | 1327 |
| Dk (1GHz) | 4.5 | 4.5 | 4.3 | 4.9 | 4.6 | 4.7 | 4.9 | 4.7 | 4.7 | 4.6 | 4.4 |
| Df (1GHz) | 0.001 | 0.001 | 0.001 | 0.001 | 0.001 | <0.001 | 0.001 | 0.003 | 0.001 | 0.001 | 0.001 |

GLASS MATERIAL WITH LOW DIELECTRIC CONSTANT AND LOW FIBERIZING TEMPERATURE

CROSS-REFERENCE TO RELATED PATENT APPLICATION

This non-provisional application claims priority to and the benefit of, under 35 U.S.C. § 119(a). Taiwan Patent Application No. 109139978 filed in Taiwan (R.O.C.) on Nov. 16, 2020. The entire content of the above identified application is incorporated herein by reference.

FIELD

The present disclosure is related to a glass material, and more particularly to a glass material with low dielectric constant (Dk) and low fiberizing temperature due to reduced silicon dioxide ($SiO_2$) content and calcium oxide (CaO) content and the properties of phosphorus pentoxide ($P_2O_5$) and zinc oxide (ZnO).

BACKGROUND

With the advancement of wired and wireless network technologies, and with the substantial increase in market demand for electronic devices (e.g., smartphones, tablet computers, electronic game consoles, smartwatches, servers, true wireless stereo (TWS) earphones, etc.), electronic devices with different functions have been developed. To increase the operating speed and frequency of an electronic device while complying with electrical specifications, it is generally required that the printed circuit board (PCB) used in the electronic device be made of a low dielectric constant (low-Dk) and low dissipation factor (low-Df) material. Due to the outstanding physical properties of glass fiber, it has become an indispensable material in modern industries. In particular, "glass yam" made of electrical-grade glass (E-glass) fiber has been one of the essential materials in the PCBs.

Generally, the process of making glass fiber out of a glass material entails placing the glass material into a furnace, where the glass material is heated to the intended temperature and melted into a mass of homogeneous molten glass. The molten glass is then extruded through a bushing to produce individual glass fibers. The fiberizing temperature (or T3, in ° C.) is related to the viscosity of glass and refers to a glass temperature at which the viscosity of the glass is 1000 poise. While a glass material is turning from a molten state into glass, bubbles are generated therein, and the higher the viscosity of the glass, the more the bubbles that will stay in the glass. The bubbles form hollow fiber structures in glass fiber and thus compromise the electrical properties of glass fiber, and circuit boards or IC substrates made of such fiber may be rendered unusable as a result. A low fiberizing temperature has the following advantages: A low fiberizing temperature indicates a low glass viscosity, meaning the bubbles in the glass can escape easily without forming hollow fiber structures. Moreover, a low fiberizing temperature helps reduce the damage caused to a bushing, and thereby extend the service life thereof.

However, conventional low-Dk glass has a fiberizing temperature higher than 1310° C. when its Dk is lower than or equal to 4.5, and has a fiberizing temperature below 1310° C. when its Dk is above 4.5. That is to say, conventional low-Dk glass cannot achieve a low fiberizing temperature and a low Dk at the same time. Accordingly, one of the issues addressed in the present disclosure is to provide an effective solution thereto so as to meet the stringent requirements of high-end electronic products.

SUMMARY

In view of the fact that conventional glass material for making glass fiber does not have a low fiberizing temperature and a low Dk at the same time, as a result of years of practical experience and repeated research, tests and manufacturing, the present disclosure provides a glass material with low Dk and low fiberizing temperature so as to effectively solve the above-referenced issue.

One aspect of the present disclosure is directed to a glass material with low Dk and low fiberizing temperature. The glass material includes silicon dioxide, boron trioxide ($B_2O_3$), aluminum oxide ($Al_2O_3$), calcium oxide, phosphorus pentoxide and zinc oxide. Silicon dioxide is one of the skeleton oxides that form glass, and makes up 45%-52% by weight of the glass material. Boron trioxide is one of the skeleton oxides that form glass, and makes up 25%-30% by weight of the glass material. Aluminum oxide is one of the skeleton oxides that form glass, and makes up 10%-14% by weight of the glass material. Calcium oxide can enhance water resistance of the glass material, and lower the melting temperature of the glass material, and makes up 1%-4% by weight of the glass material. Phosphorus pentoxide is a nonmetallic compound like silicon dioxide, and makes up 0-3% by weight of the glass material. Zinc oxide can lower the Dk of the glass material, has a fluxing effect, and makes up 1%-5% by weight of the glass material. The glass material disclosed herein is endowed with both a low Dk and a low fiberizing temperature by reducing its silicon dioxide content and calcium oxide content and taking advantage of the properties of phosphorus pentoxide and zinc oxide.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 1 shows test results of the glass material with low Dk and low fiberizing temperature according to the present disclosure, shown as embodiments A1-A3, and test results of the comparative examples A4-A11 of conventional low-Dk glass.

DETAILED DESCRIPTION

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like.

One aspect of the present disclosure is directed to a glass material that has a low Dk and a low fiberizing temperature and can be used to make glass fiber or other glass products. In certain embodiments, the glass material includes silicon dioxide, boron trioxide, aluminum oxide, calcium oxide, and zinc oxide. Silicon dioxide is one of the skeleton oxides that form glass. The higher the silicon dioxide content, the higher the viscosity of the glass material; and the higher the viscosity of the glass material, the higher the fiberizing temperature (T3, in ° C.). Reducing the silicon dioxide content will lower the viscosity and fiberizing temperature of the glass material, but increase the Dk of the glass material. In certain embodiments, therefore, silicon dioxide makes up 45%-52% by weight of the glass material in order to lower the fiberizing temperature of the glass material, while the glass material is added with phosphorus pentoxide, which is also a nonmetallic compound, to prevent the Dk of the glass material from increasing. Phosphorus pentoxide exists in the glass material in the form of a phosphorus-oxygen tetrahedron, which is positively charged and hence readily connectable with a boron-oxygen tetrahedron, which is negatively charged, to form a more stable glass structure and thereby lower the Dk of the glass material. In certain embodiments, phosphorus pentoxide makes up 0-3% by weight of the glass material.

Boron trioxide is another skeleton oxide that forms glass. Boron trioxide can lower the viscosity and Dk of the glass material, and evaporates easily. The boron trioxide content of the glass material should not be too high, as an excessively high boron trioxide content not only is disadvantageous to the fiberizing of glass, but also will reduce the water resistance of the glass material. In certain embodiments, therefore, boron trioxide makes up 25%-30%, preferably 26%-29%, by weight of the glass material. Aluminum oxide is another skeleton oxide that forms glass. Inadequate aluminum oxide content will reduce the water resistance, and increase the Dk, of the glass material. If the aluminum oxide content of the glass material exceeds 18%, however, the viscosity and fiberizing temperature of the glass material will increase. In certain embodiments, therefore, aluminum oxide makes up 10%-14%, preferably 11%-13%, by weight of the glass material.

Calcium oxide can change the internal connection and arrangement of the glass material, prevent boron trioxide from turning into boric acid ($H_3BO_3$), and enhance the water resistance of the glass material. Calcium oxide can also lower the melting temperature of the glass material by altering the network structure in the glass material and reducing the crystallization of the glass material. If the calcium oxide content of the glass material exceeds 4%, however, the Dk of the glass material will increase. In certain embodiments, therefore, calcium oxide makes up 1%-4% by weight of the glass material. Zinc oxide has a better fluxing effect (i.e., can better lower the viscosity of the glass material when the glass material is in a molten state) than calcium oxide. Moreover, zinc oxide contributes to a tighter network structure in the glass material and consequently a lower Dk of the glass material. In certain embodiments, therefore, zinc oxide is substituted for some of the calcium oxide and makes up 1%-5%, preferably 3%-5%, by weight of the glass material.

In certain embodiments, the glass material further includes magnesium oxide (MgO), titanium dioxide ($TiO_2$), fluorine ($F_2$), and at least one alkali metal oxide. Magnesium oxide can lower the melting temperature of the glass material to facilitate melting and forming of the glass material. However, too high a magnesium oxide content not only is disadvantageous to lowering the Dk and dielectric loss of the glass material, but also will encourage phase separation in the glass material. In certain embodiments, therefore, magnesium oxide makes up 0.1%-2.0% by weight of the glass material. Titanium dioxide can lower the viscosity temperature to be reached when melting the glass material. An overly high titanium dioxide content, however, will increase the Dk of the glass material and have a negative effect on the color of the glass material. In certain embodiments, therefore, titanium dioxide makes up 0.25%-0.80% by weight of the glass material. Fluorine, which serves mainly as a flux when used in glass, can lower the viscosity of the glass material when the glass material is in a molten state. When the fluorine content is less than 0.5%, however, the fluxing effect of fluorine is not evident, but if the fluorine content exceeds 3%, not only will evaporation from the glass material and corrosiveness to refractory materials be increased, but also phase separation tends to take place in the glass material. In certain embodiments, therefore, fluorine makes up 0.01%-2.00%, preferably 1.00%-1.50%, by weight of the glass material. Fluorine exists in the glass material in the form of a fluoride such as calcium fluoride ($CaF_2$), magnesium fluoride ($MgF_2$), etc. The alkali metal oxide includes at least one of sodium oxide ($Na_2O$), potassium oxide ($K_2O$), lithium oxide ($Li_2O$) etc. The alkali metal oxide functions as a flux in the glass material and can lower the viscosity of the glass material when the glass material is in a molten state. An overly high total content of the alkali metal oxide, however, results in an increase of the Dk of the glass material and a reduction in water resistance. In certain embodiments, therefore, the alkali metal oxide makes up 0.01%-1.00%, preferably 0.10%-0.80%, by weight of the glass material.

According to the above, during the process of melting the glass material into a mass of molten glass and extruding the molten glass through a bushing to manufacture glass fiber, due to the reduced silicon dioxide content and calcium oxide content in the glass material and the properties of phosphorus pentoxide and zinc oxide, the glass material has a low Dk and a low fiberizing temperature, which enable the products made by the glass material, such as circuit boards, to have a lower Dk during high-frequency transmission, so as to meet the electrical requirements of the circuit boards. To further display the performance difference between that achieved by the techniques according to the present disclosure and that by the conventional techniques, referring to FIG. 1, several batches of the glass material according to the present disclosure (namely batches A1-A3, the proportions of whose ingredients were different) and several batches of conventional materials (namely batches A4-A11, the proportions of whose ingredients were also different) were tested. Each batch was poured into a ceramic crucible, subjected to a high temperature for a predetermined amount of time until completely melted, and then cooled down slowly to room temperature to form a block of glass. Each block of glass was cut with a diamond blade into thin glass plate samples that were 20 mm long and wide and 2.0-3.0 mm thick. The Dk and dissipation factor (Df) of each glass plate sample were measured with a radio-frequency (RF) impedance analyzer. The fiberizing temperatures were determined by measuring the viscosity of each glass plate sample at different temperatures with a high-temperature viscometer. According to the test results shown in FIG. 1, the glass materials according to the present disclosure have Dks lower than or equal to 4.5 and fiberizing temperatures lower than 1310° C. The glass materials according to the present disclosure are distinguished from the conventional glass products in that a low Dk and a low fiberizing temperature were achieved at the same time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A glass material, comprising:
   a first skeleton oxide for forming glass from the glass material, wherein the first skeleton oxide is silicon dioxide, making up 45%-52% by weight of the glass material;
   a second skeleton oxide for forming glass from the glass material, wherein the second skeleton oxide is boron trioxide, making up 25%-30% by weight of the glass material;
   a third skeleton oxide for forming glass from the glass material, wherein the third skeleton oxide is aluminum oxide, making up 1.0%-14% by weight of the glass material;
   calcium oxide for enhancing water resistance of the glass material and lowering a melting temperature of the glass material, making up 1%-4% by weight of the glass material;
   zinc oxide for lowering a dielectric constant of the glass material and producing a fluxing effect, making up 1%-5% by weight of the glass material; and
   titanium dioxide for lowering a viscosity temperature of the glass material, making up 0.25%-0.80% by weight of the glass material.

2. The glass material according to claim 1, further comprising phosphorus pentoxide, wherein the phosphorus pentoxide makes up 3% or less and greater than 0% by weight of the glass material.

3. The glass material according to claim 2, wherein the phosphorus pentoxide is in a form of phosphorus-oxygen tetrahedron.

4. The glass material according to claim 1, further comprising magnesium oxide for lowering the melting temperature of the glass material, making up 0.1%-2.0% by weight of the glass material.

5. The glass material according to claim 1, further comprising a flux, wherein the flux comprises fluorine, and the fluorine makes up 0.01%-2.00% by weight of the glass material.

6. The glass material according to claim 5, wherein the fluorine is in a form of fluoride.

7. The glass material according to claim 1, further comprising alkali metal oxide, wherein a summation of every single one of the alkali metal oxide makes up 0.01%-1.00% by weight of the glass material.

8. The glass material according to claim 7, wherein the alkali metal oxide comprises at least one of sodium oxide, potassium oxide and lithium oxide.

9. The glass material according to claim 1, wherein the boron trioxide makes up 26%-29% by weight of the glass material.

10. The glass material according to claim 2, wherein the boron trioxide makes up 26%-29% by weight of the glass material.

11. The glass material according to claim 3, wherein the boron trioxide makes up 26%-29% by weight of the glass material.

12. The glass material according to claim 4, wherein the boron trioxide makes up 26%-29% by weight of the glass material.

13. The glass material according to claim 5, wherein the boron trioxide makes up 26%-29% by weight of the glass material.

14. The glass material according to claim 6, wherein the boron trioxide makes up 26%-29% by weight of the glass material.

15. The glass material according to claim 7, wherein the boron trioxide makes up 26%-29% by weight of the glass material.

16. The glass material according to claim 8, wherein the boron trioxide makes up 26%-29% by weight of the glass material.

17. The glass material according to claim 1, wherein the aluminum oxide makes up 11%-13% by weight of the glass material.

18. The glass material according to claim 2, wherein the aluminum oxide makes up 11%-13% by weight of the glass material.

19. The glass material according to claim 3, wherein the aluminum oxide makes up 11%-13% by weight of the glass material.

20. The glass material according to claim 4, wherein the aluminum oxide makes up 11%-13% by weight of the glass material.

21. The glass material according to claim 5, wherein the aluminum oxide makes up 11%-13% by weight of the glass material.

22. The glass material according to claim 6, wherein the aluminum oxide makes up 11%-13% by weight of the glass material.

23. The glass material according to claim 7, wherein the aluminum oxide makes up 11%-13% by weight of the glass material.

24. The glass material according to claim 8, wherein the aluminum oxide makes up 11%-13% by weight of the glass material.

25. The glass material according to claim 1, wherein the zinc oxide makes up 3%-5% by weight of the glass material.

26. The glass material according to claim 2, wherein the zinc oxide makes up 3%-5% by weight of the glass material.

27. The glass material according to claim 3, wherein the zinc oxide makes up 3%-5% by weight of the glass material.

28. The glass material according to claim 4, wherein the zinc oxide makes up 3%-5% by weight of the glass material.

29. The glass material according to claim 5, wherein the zinc oxide makes up 3%-5% by weight of the glass material.

30. The glass material according to claim 6, wherein the zinc oxide makes up 3%-5% by weight of the glass material.

31. The glass material according to claim 7, wherein the zinc oxide makes up 3%-5% by weight of the glass material.

32. The glass material according to claim 8, wherein the zinc oxide makes up 3%-5% by weight of the glass material.

33. The glass material according to claim 5, wherein the fluorine makes up 1.00%-1.50% by weight of the glass material.

34. The glass material according to claim 7, wherein the summation of every single one of the alkali metal oxide makes up 0.10%-0.80% by weight of the glass material.

35. A glass material, comprising:
  a first skeleton oxide for forming glass from the glass material, wherein the first skeleton oxide is silicon dioxide, making up 45%-52% by weight of the glass material;
  a second skeleton oxide for forming glass from the glass material, wherein the second skeleton oxide is boron trioxide, making up 25%-30% by weight of the glass material;
  a third skeleton oxide for forming glass from the glass material, wherein the third skeleton oxide is aluminum oxide, making up 10%-14% by weight of the glass material;
  calcium oxide for enhancing water resistance of the glass material and lowering a melting temperature of the glass material, making up 1%-4% by weight of the glass material;
  zinc oxide for lowering a dielectric constant of the glass material and producing a fluxing effect, making up 1%-5% by weight of the glass material; and
  a flux, wherein the flux comprises fluorine, and the fluorine makes up 0.01%-2.00% by weight of the glass material.

36. The glass material according to claim 35, wherein the fluorine is in a form of fluoride.

37. The glass material according to claim 35, wherein the fluorine makes up 1.00%-1.50% by weight of the glass material.

38. The glass material according to claim 35, further comprising phosphorus pentoxide, wherein the phosphorus pentoxide makes up 3% or less and greater than 0% by weight of the glass material.

* * * * *